United States Patent
Loyd

(10) Patent No.: US 12,367,570 B2
(45) Date of Patent: Jul. 22, 2025

(54) SYSTEM AND METHOD FOR RAILROAD TRACK GEOMETRY MEASUREMENT

(71) Applicant: BNSF Railway Company, Fort Worth, TX (US)

(72) Inventor: Kanyon W. Loyd, Fort Worth, TX (US)

(73) Assignee: BNSF Railway Company, Fort Worth, TX (US)

( * ) Notice: Subject to any disclaimer, the term of this patent is extended or adjusted under 35 U.S.C. 154(b) by 385 days.

(21) Appl. No.: 17/932,554

(22) Filed: Sep. 15, 2022

(65) Prior Publication Data

US 2024/0095898 A1    Mar. 21, 2024

(51) Int. Cl.
| | |
|---|---|
| G06T 7/13 | (2017.01) |
| B61L 23/04 | (2006.01) |
| G01M 5/00 | (2006.01) |
| G06T 7/00 | (2017.01) |
| G06T 7/60 | (2017.01) |

(52) U.S. Cl.
CPC .......... *G06T 7/0004* (2013.01); *B61L 23/044* (2013.01); *B61L 23/048* (2013.01); *G01M 5/0033* (2013.01); *G01M 5/0058* (2013.01); *G01M 5/0091* (2013.01); *G06T 7/13* (2017.01); *G06T 7/60* (2013.01); *G06T 2207/30136* (2013.01)

(58) Field of Classification Search
CPC ........ G06V 10/82; G06V 10/24; G06V 10/28; G06V 10/776; G06V 10/778; G06V 2201/07; G06V 10/77; H04L 63/1433; H04L 63/1416; G06N 3/08; G06N 20/00; G06F 21/566
See application file for complete search history.

(56) References Cited

U.S. PATENT DOCUMENTS

| | | |
|---|---|---|
| 7,463,348 B2 | 12/2008 | Chung |
| 9,441,956 B2 | 9/2016 | Kainer et al. |
| (Continued) | | |

FOREIGN PATENT DOCUMENTS

| | | |
|---|---|---|
| EP | 1236634 A1 | 9/2002 |
| IN | 201811046682 A | 6/2020 |

OTHER PUBLICATIONS

Detection and Measurement of Railway Expansion Gap with Image Processing (Year: 2021).*

(Continued)

*Primary Examiner* — Huo Long Chen
(74) *Attorney, Agent, or Firm* — Whitaker Chalk Swindle & Schwartz PLLC; Enrique Sanchez, Jr.; Juan Vasquez

(57) ABSTRACT

Methods and systems for detecting and measuring physical conditions of a railroad track based on image-based distance measurements are provided. In embodiments, at least one object associated with a condition of a railroad track is detected in at least one image. A first point and a second point on the at least one object is detected. A pixel distance between the first point and the second point is measured, and a physical distance-based measurement of the condition of the railroad track is determined, using a conversion model, based on the pixel distance between the first point and the second point. An alert is generated when the physical distance-based measurement of the condition of the railroad track exceeds a predetermined threshold.

14 Claims, 6 Drawing Sheets

(56) References Cited

U.S. PATENT DOCUMENTS

| | | |
|---|---|---|
| 9,810,533 B2 | 11/2017 | Fosburgh et al. |
| 10,518,791 B2 | 12/2019 | Singh |
| 2012/0274772 A1* | 11/2012 | Fosburgh ............... G01C 11/04 |
| | | 348/149 |
| 2012/0300060 A1 | 11/2012 | Farritor |
| 2013/0132186 A1* | 5/2013 | Paradies ............ G06Q 30/0231 |
| | | 705/14.31 |
| 2019/0179312 A1* | 6/2019 | Kong ................... G08G 1/0145 |
| 2019/0368133 A1* | 12/2019 | Joshi ...................... G06N 20/00 |
| 2020/0398876 A1 | 12/2020 | Mesher |
| 2021/0114637 A1 | 4/2021 | Chung et al. |
| 2022/0063689 A1 | 3/2022 | Kumar et al. |

OTHER PUBLICATIONS

Urszula, Attempts at Automatic Detection of Railway Head Edges from Images and Laser Data, Dec. 31, 2012.

Zhang, A Novel Decomposition Model for Visual Rail Surface Inspection, May 26, 2021.

\* cited by examiner

SYSTEM AND METHOD FOR RAILROAD TRACK GEOMETRY MEASUREMENT

TECHNICAL FIELD

The present invention relates generally to condition detection in physical components, and more particularly to techniques for measuring conditions in railroad tracks based on image-based analysis.

BACKGROUND

Railroads play a significant role in freight transportation. Trains, which typically include a locomotive engine and one or more train cars, travel over a railroad track to transport freight. A typical track may include a combination of objects. For example, a track may include two rails laid down in parallel to each other, which may provide a surface over which the wheels of the train cars can be moved and guided. The parallel rail lines may be attached to cross ties laid down perpendicular to the rails to provide structural support go the railroad track. Each of the rails of the railroad track may be composed of multiple rail sections. For example, each of the multiple rail sections may be connected to another rail section, end to end, to form a rail of the railroad track. A rail section may be connected to another rail section using a rail joint, in which case an end of one of the rail sections may be positioned against an end of another one of the rail sections and a joint bar of the rail joint may be attached to each of the two rail sections to connect the two rail sections. The gap between the two ends of the rail sections connected to each other at each joint section may be referred to as a rail gap. The combination of the various components of a railroad track may operate to allow a train to travel down the railroad track.

Given our reliance on railroads, determining the condition of railroad track components is very important. Currently, determining the condition of railroad track components may be done via manual inspections. However, such a process is tedious and, in some cases, prohibitive, given the sheer length of a railroad track, which means that there may be thousands and thousands of components to inspect. This is why current systems may also use computer vision to determine the condition of the railroad track components. In particular, when using computer vision, images of various sections of a railroad track may be captured and processed to determine the condition of the various components of the railroad track detected in the captured images.

However, current object detection systems often lack functionality to determine a condition of a railroad track component based on distance measurements. For example, the condition of a joint section of a railroad track (e.g., the section at which one rail section connects to another rail section using a rail joint) may be determined by the size of the rail gap between the two rail sections, but current systems lack functionality to measure a rail gap. In another example, a condition of a component may be determined by the size of a defect on the component. For example, the size of a crack on a rail surface may determine the condition of the rail, as a small crack may not be indicative of a problem, whereas a bigger crack may indicate that the rail surface is defective and may require maintenance. Yet other examples of condition based on distance measurements may include how the spacing between cross ties may indicate a condition of a railroad track, or how the distance between an anchor and a cross tie may indicate a condition.

SUMMARY

The present disclosure achieves technical advantages as systems, methods, and computer-readable storage media that provide functionality for detecting and measuring physical conditions of a railroad track based on image-based distance measurements. The present disclosure provides for a system integrated into a practical application with meaningful limitations that may include obtaining an image of at least a portion of a railroad track, detecting at least one object in the image associated with a condition of the railroad track; detecting a first point and a second point within the at least one object, measuring a pixel distance between the first point and the second point, determining, using a conversion model, a physical distance-based measurement of the condition of the railroad track based on the pixel distance between the first point and the second point, and generating an alert when the physical distance-based measurement of the condition of the railroad track exceeds a predetermined threshold. For example, in embodiments, a discontinuity may be detected in an image of a rail joint section. The discontinuity may represent a rail gap between a first rail section and a second rail section, and a size of the discontinuity may represent a condition of the railroad track. In embodiments, an edge of an end of the first rail section and an edge of an end of the second rail section may be detected based on the detected discontinuity, and a first point in the edge of the end of the first rail section and a second point in the edge of the end of the second rail section may be identified. In embodiments, a pixel distance between the first point and the second point may be measured, and a physical size of the rail gap may be determined, using a conversion model, based on the pixel distance between the first point and the second point. In some embodiments, an alert may be generated when the physical size of the rail gap exceeds a predetermined threshold.

The present disclosure solves the technological problem of a lack of technical functionality for determining conditions of railroad track components based on image-based distance measurements in current systems by providing methods and system that provide a novel and inventive mechanism to determine conditions of railroad tracks based on distance-based measurements. The technological solutions provided herein, and missing from conventional systems, are more than a mere application of a manual process to a computerized environment, but rather include functionality to implement a technical process to supplement current manual solutions for inspecting railroad tracks and to augment current object detections systems by providing a mechanism for determining conditions of a railroad track based on distance-based measurements of detected objects. In doing so, the present disclosure goes well beyond a mere application the manual process to a computer. For example, the present disclosure provides solutions that include implementing functionality to determine a physical size of a condition present in a railroad track based on pixel-based measurements applied to image-based detections. Alerts may be generated based on whether the physical size of the condition of the railroad track exceeds predetermined thresholds.

Accordingly, the present disclosure discloses concepts inextricably tied to computer technology such that the present disclosure provides the technological benefit of implementing functionality to determine conditions of railroad tracks based on distance-based measurements. The systems and techniques of embodiments provide improved systems by providing capabilities to perform functions that are currently performed manually and to perform functions that are currently not possible.

It is an object of the invention to provide a system for determining a condition of a railroad track. It is a further object of the invention to provide a method of determining a condition of a railroad track. It is still a further object of the invention to provide a computer-based tool for determining a condition of a railroad track. These and other objects are provided by the present disclosure, including at least the following embodiments.

In one particular embodiment, a method of determining a condition of a railroad track is provided. The method includes detecting at least one object in at least one image of at least a portion of a railroad track, the at least one object associated with at least one condition of the railroad track, identifying a first point and a second point on the at least one object detected in the at least one image of the at least a portion of the railroad track, and measuring a pixel distance between the first point and the second point. In embodiments, the pixel distance between the first point and the second point may indicate a number of pixels in a line between the first point and the second point. The method also includes determining, using a conversion model, a physical size of the at least one condition of the railroad track associated with the at least one object based on the pixel distance between the first point and the second point, and generating an alert when the physical size of the at least one condition of the railroad track exceeds a predetermined threshold.

In another embodiment, a method of determining a condition of a railroad track is provided. The method includes detecting a discontinuity in a rail joint section in an image of at least a portion of a railroad track, the discontinuity representing a rail gap between a first rail section and a second rail section, detecting an edge of an end of the first rail section and an edge of an end of the second rail section based on the detected discontinuity, identifying a first point in the edge of the end of the first rail section and a second point in the edge of the end of the second rail section, and measuring a pixel distance between the first point and the second point. In embodiments, the pixel distance between the first point and the second point may indicate a number of pixels in a line between the first point and the second point. The method also includes determining, using a conversion model, a physical size of the rail gap based on the pixel distance between the first point and the second point, and generating an alert when the physical size of the rail gap exceeds a predetermined threshold.

In yet another embodiment, a computer-based tool for determining a condition of a railroad track is provided. The computer-based tool may include non-transitory computer readable media having stored thereon computer code which, when executed by a processor, causes a computing device to perform operations. The operations include detecting at least one object in at least one image of at least a portion of a railroad track, the at least one object associated with at least one condition of the railroad track, identifying a first point and a second point on the at least one object detected in the at least one image of the at least a portion of the railroad track, and measuring a pixel distance between the first point and the second point. In embodiments, the pixel distance between the first point and the second point may indicate a number of pixels in a line between the first point and the second point. The operations also include determining, using a conversion model, a physical size of the at least one condition of the railroad track associated with the at least one object based on the pixel distance between the first point and the second point, and generating an alert when the physical size of the at least one condition of the railroad track exceeds a predetermined threshold.

In still another embodiment, a computer-based tool for determining a condition of a railroad track is provided. The computer-based tool may include non-transitory computer readable media having stored thereon computer code which, when executed by a processor, causes a computing device to perform operations. The operations include detecting a discontinuity in a rail joint section in an image of at least a portion of a railroad track, the discontinuity representing a rail gap between a first rail section and a second rail section, detecting an edge of an end of the first rail section and an edge of an end of the second rail section based on the detected discontinuity, identifying a first point in the edge of the end of the first rail section and a second point in the edge of the end of the second rail section, and measuring a pixel distance between the first point and the second point. In embodiments, the pixel distance between the first point and the second point may indicate a number of pixels in a line between the first point and the second point. The operations also include determining, using a conversion model, a physical size of the rail gap based on the pixel distance between the first point and the second point, and generating an alert when the physical size of the rail gap exceeds a predetermined threshold.

In still another embodiment, a system for determining a condition of a railroad track is provided. The system comprises at least one processor and a memory operably coupled to the at least one processor and storing processor-readable code that, when executed by the at least one processor, is configured to perform operations. The operations include detecting at least one object in at least one image of at least a portion of a railroad track, the at least one object associated with at least one condition of the railroad track, identifying a first point and a second point on the at least one object detected in the at least one image of the at least a portion of the railroad track, and measuring a pixel distance between the first point and the second point. In embodiments, the pixel distance between the first point and the second point may indicate a number of pixels in a line between the first point and the second point. The operations also include determining, using a conversion model, a physical size of the at least one condition of the railroad track associated with the at least one object based on the pixel distance between the first point and the second point, and generating an alert when the physical size of the at least one condition of the railroad track exceeds a predetermined threshold.

In still another embodiment, a system for determining a condition of a railroad track is provided. The system comprises at least one processor and a memory operably coupled to the at least one processor and storing processor-readable code that, when executed by the at least one processor, is configured to perform operations. The operations include detecting a discontinuity in a rail joint section in an image of at least a portion of a railroad track, the discontinuity representing a rail gap between a first rail section and a second rail section, detecting an edge of an end of the first rail section and an edge of an end of the second rail section based on the detected discontinuity, identifying a first point in the edge of the end of the first rail section and a second point in the edge of the end of the second rail section, and measuring a pixel distance between the first point and the second point. In embodiments, the pixel distance between the first point and the second point may indicate a number of pixels in a line between the first point and the second point. The operations also include determining, using a conversion model, a physical size of the rail gap based on the pixel distance between the first point and the second point, and generating an alert when the physical size of the rail gap exceeds a predetermined threshold.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

Figure 1:
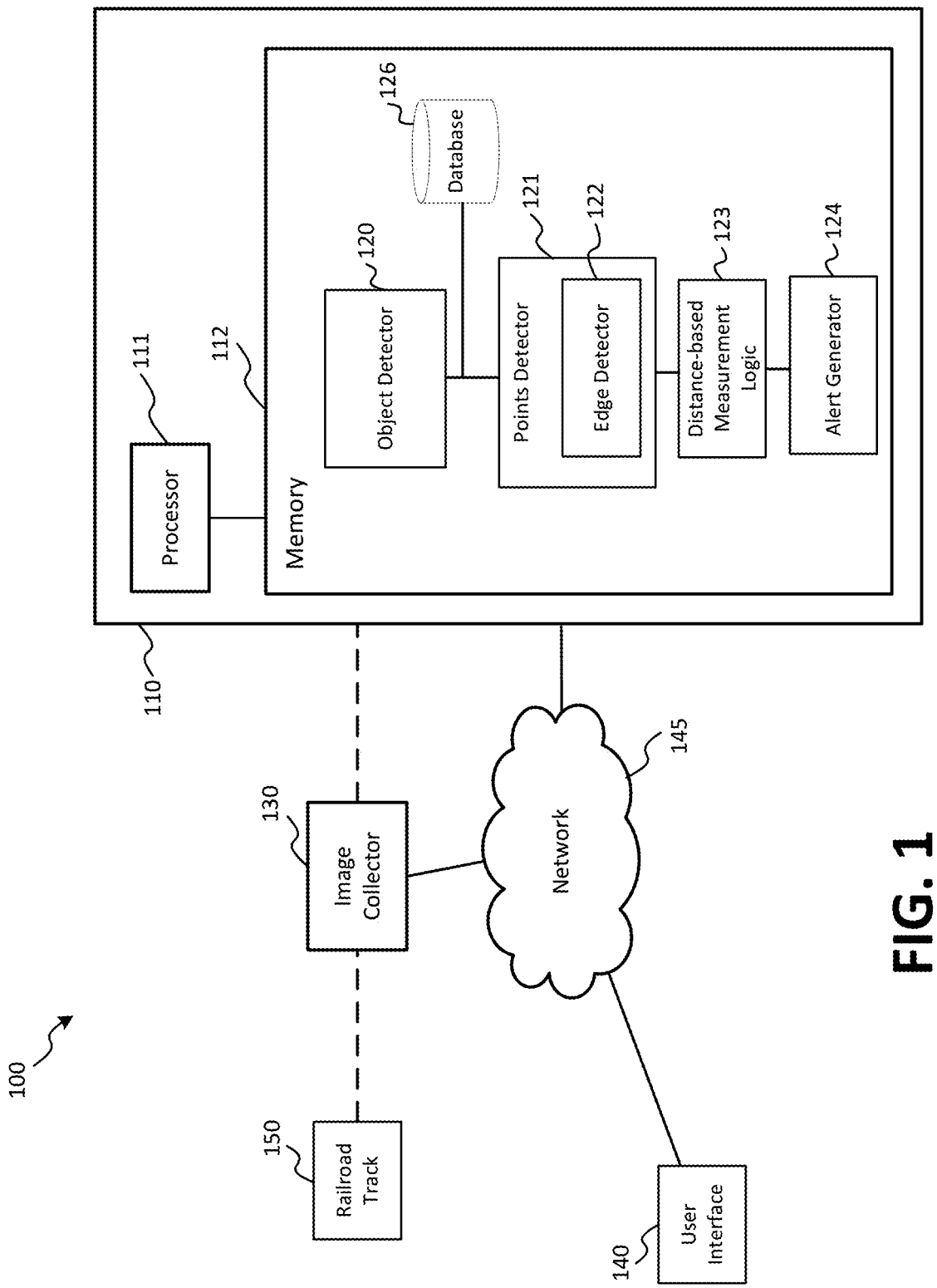
FIG. 1 is a block diagram of an exemplary system configured with capabilities and functionality for detecting and measuring conditions of a railroad track and/or railroad track components based on image-based distance measurements in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to systems and techniques that provide functionality for detecting and measuring conditions of a railroad track and/or railroad track components based on image-based distance measurements. In particular embodiments, an image of at least a portion of a railroad track may be obtained. For example, an image of a portion of a railroad track including a rail joint section may be obtained. In embodiments, at least one object associated with a condition of the railroad track may be detected in the image, and a first point and a second point within the at least one object may be identified. For example, a discontinuity in the rail joint section may be detected in the image of the railroad track. In this example, the discontinuity may represent a rail gap between a first rail section and a second rail section, and a physical size of the rail gap may represent a condition of the railroad track. In this example, an edge of an end of the first rail section and an edge of an end of the second rail section may be detected based on the detected discontinuity, and a first point in the edge of the end of the first rail section and a second point in the edge of the end of the second rail section may be identified. In embodiments, a pixel distance between the first point and the second point may be measured. The pixel distance between the first point and the second point may indicate a number of pixels in a line between the first point and the second point. For example, the number of pixels in the line between the between the first point and the second point may be measured and/or obtained. In embodiments, a physical distance-based measurement of the condition of the railroad track may be determined, using a conversion model, based on the pixel distance between the first point and the second point. For example, a physical size of the rail gap may be determined, using a conversion model, based on the pixel distance between the first point and the second point. In embodiments, an alert may be generated when the physical distance-based measurement of the condition of the railroad track exceeds a predetermined threshold. For example, an alert may be generated when the physical size of the rail gap exceeds a predetermined threshold.

It is noted that, although the disclosure that follows is focused on an example application in which a condition of a railroad track is described as a size of a rail gap in a rail joint section, this is for illustrative purposes and not intended to be limiting in any way. Indeed, in some embodiments, the condition of the railroad track may include, as a non-liming and non-exhaustive list, a size of a rail surface condition (e.g., a size of a crack, metal fatigue, and/or other defects in the surface of a rail), the spacing or distance between cross ties in a railroad track, the separation between a tie anchor and a cross tie, etc. These examples illustrate conditions that may be measured or quantified by techniques disclosed in the embodiments of the present disclosure, but other examples are also envisioned.

FIG. 1 is a block diagram of an exemplary system 100 configured with capabilities and functionality for detecting and measuring conditions of a railroad track and/or railroad track components based on image-based distance measurements in accordance with embodiments of the present disclosure. As shown in FIG. 1, system 100 may include server 110, image collector 130, network 145, and user interface 140. These components, and their individual components, may cooperatively operate to provide functionality in accordance with the discussion herein. For example, in operation according to embodiments, image collector 130 may operate to obtain image data associated with at least a portion of a railroad track (e.g., railroad track 150). In embodiments, the image data obtained by image collector 130 may include at least one object associated with a condition of railroad track 150. Functionality of server 110 may operate to process the image data obtained by image collector 130, to detect the at least one object associated with the condition of railroad track 150 based on the image data, and to determine a physical distance measurement associated with the condition. For example, in some embodiments, a physical size (e.g., length, width, area, volume, etc.) of the condition of railroad track 150 may be obtained via the functionality of server 110. Functionality of server 110 may operate to generate an alert in response to a determination that the physical distance measurement of the condition of railroad track 150 exceeds a predetermined threshold. In embodiments, the alert may be transmitted and received by a user interface, e.g., user interface 140. Corrective action, such as in-depth inspections, replacements, repairs, etc., may be taken with respect to the condition of railroad track 150 in response to the alert.

It is noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally, or alternatively, when implemented in software, one or more of the functional blocks, or some portion thereof, may comprise code segments operable upon a processor to provide logic for performing the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network, such as one of network 145.

User interface 140 may be implemented as, or as part of, a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. In embodiments, user interface 140 may be configured to provide an interface (e.g., a graphical user interface (GUI)) structured to facilitate an operator interacting with system 100, e.g., via network 145, to execute and leverage the features provided by server 110. In embodiments, the operator may be enabled, e.g., through the functionality of user terminal 140, to provide configuration parameters that may be used by system 100 to provide functionality for performing identification and/or measurements of railroad track conditions. In embodiments, user terminal 140 may be configured to communicate with other components of system 100. In embodiments, the functionality of user terminal 140 may include receiving alerts (e.g., alerts generated using the functionality of server 110). In embodiments, the alerts may be presented to an operator via the GIU of user terminal 140.

Image collector 130 may be configured to obtain image data associated with at least a portion of a railroad track (e.g., railroad track 150) and to transmit or pass on the image data to server 110 for further processing. For example, in some embodiments, image collector 130 may include one or more cameras configured to capture images of at least a portion of railroad track 150. In some embodiments, the one or more cameras may be physically mounted on a train car (not shown). As the train car travels on a railroad track (e.g., railroad track 150), the one or more cameras may capture or collect images of different portions of the railroad track. In alternative or additional embodiments, image collector 130 may be configured receive the image data from an external system. For example, in some embodiments, an external system may capture the image data associated with the at least a portion of the railroad track and may provide the image data to image collector 130, which may provide the image data to server 110 for further processing. In some of these cases, the functionality of image collector 130 to receive the image data from an external system may be integrated into server 110 (even though it may be illustrated as separate functionality in FIG. 1).

In embodiments, image data collection and processing may be performed in real-time or near real-time. For example, image collector 130 may obtain the image data associated with at least a portion of the railroad track as the image data is captured and may provide the image data to server 110 for processing as the image data is obtained. In some embodiments, the image data may be captured, but the image data may not be immediately provided to server 110 for processing as the image data is obtained and instead the image data may be stored for subsequent and later processing by server 110.

In embodiments, the image data obtained by image collector 130 may include image data associated with more than one portions of railroad track 150. For example, the image data may include images of different portions of railroad track 150. The portions of railroad track 150 for which image data may be obtained may be determined based on the configuration of system 100. For example, in some embodiments, image data for railroad track 150 may be obtained for targeted portions of railroad track 150. In some cases, the targeted portions of railroad track 150 may include a particular section of railroad track 150. For example, in some embodiments, image data for every rail joint section, image data for every rail section, etc., may be captured. In these cases, the image data may represent image data for the railroad track section (e.g., rail joint section, rail section, tie sections, etc.) targeted. In some embodiments, the image data associated with railroad track 150 may be captured based on a calibrated pulse encoder. For example, a pulse encoder may be positioned on a wheel of a train car upon which image detector 130 may be mounted, and the pulse encoder may be used to trigger capturing of images of the railroad track. It is noted that, in these embodiments, the size of the image data (e.g., images associated with at least a portion of the railroad track) in terms of pixels may be highly correlated with the physical size of the at least a portion of the railroad track. In these cases, a size of an image of a first portion of the railroad track may correlate highly to a physical size of the first portion. In this manner, the size of a pixel in the image data obtained by image collector 130 may correlate highly to a physical size. In some embodiments, the image data associated with railroad track 150 may be captured based on a schedule. For example, as a train car configured to capture the image data is traveling over railroad track 150, image data may be captured every number of seconds, minutes, hours, etc. In some embodiments, image data for railroad track 150 may be captured continuously. For example, as a train car configured to capture the image data is traveling over railroad track 150, image data may be continuously captured.

Figure 2A:
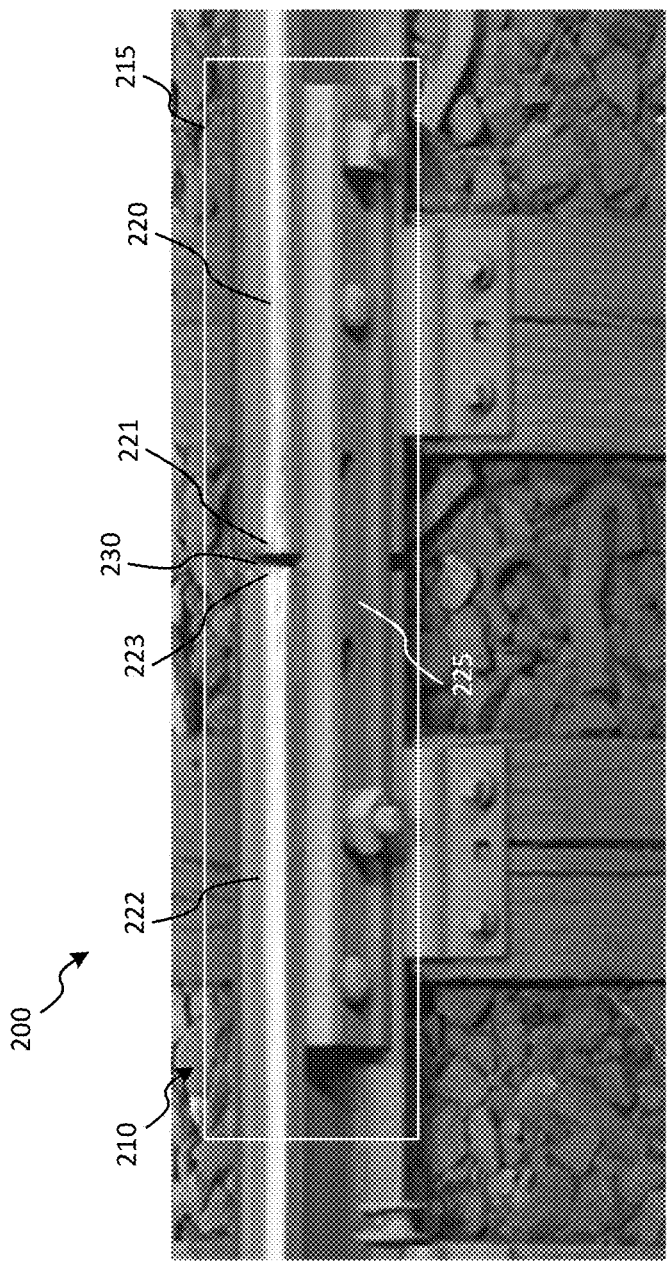
FIG. 2A shows an example of image data captured in accordance with embodiments of the present disclosure.

In particular embodiments, such as where the image data obtained by image collector 130 represents image data associated with rail joint sections, the image data may include various railroad track components (e.g., rails, cross ties, spikes, anchors, rail joints, rail gaps, etc.). FIG. 2A shows an example of image data captured in accordance with embodiments of the present disclosure. As shown in FIG. 2A, image data 200 may include image data for railroad track portion 210. In this example, railroad track portion 210 may include rail joint section 215, which may be where rail section 220 and rail section 222 connect to each other. For example, rail section end 221 of rail section 220 may be connected to rail section end 223 of rail section 222 to form the rail joint. As shown in FIG. 2A, rail section 220 and rail section 222 are joined together using joint bar 225. In embodiments, there may be a rail gap between rail section 220 and rail section 222 at the rail joint. In particular, rail gap 230 may be present between rail section end 221 and rail section end 223. In embodiments, rail gap 230 may be represented in image data 200 by a discontinuity in the surface of the rail formed by rail section 220 and rail section 222.

It is noted that the inventors have found that characteristics of a rail gap may affect performance of a railroad track. In particular, the size of a rail gap may affect the performance of the railroad track in which the rail gap is present. For example, a rail gap that is too wide may indicate a problem with a joint bar used to attach the rail sections forming the rail gap. For example, the joint bar may have been installed incorrectly, may have too much wear, may have loose bolts or spikes, etc. Any of these issues may cause problems or may even lead to catastrophic failure. Moreover, a rail gap that is too wide has the potential to cause damage to a wheel of a train car or locomotive traveling over the railroad, or to cause derailment. As such, providing a mechanism to ensure that the size of a rail gap is within acceptable parameters, such as provided by embodiments of the present disclosure, significantly improves a railway system and may avoid catastrophic failures.

Figure 2B:
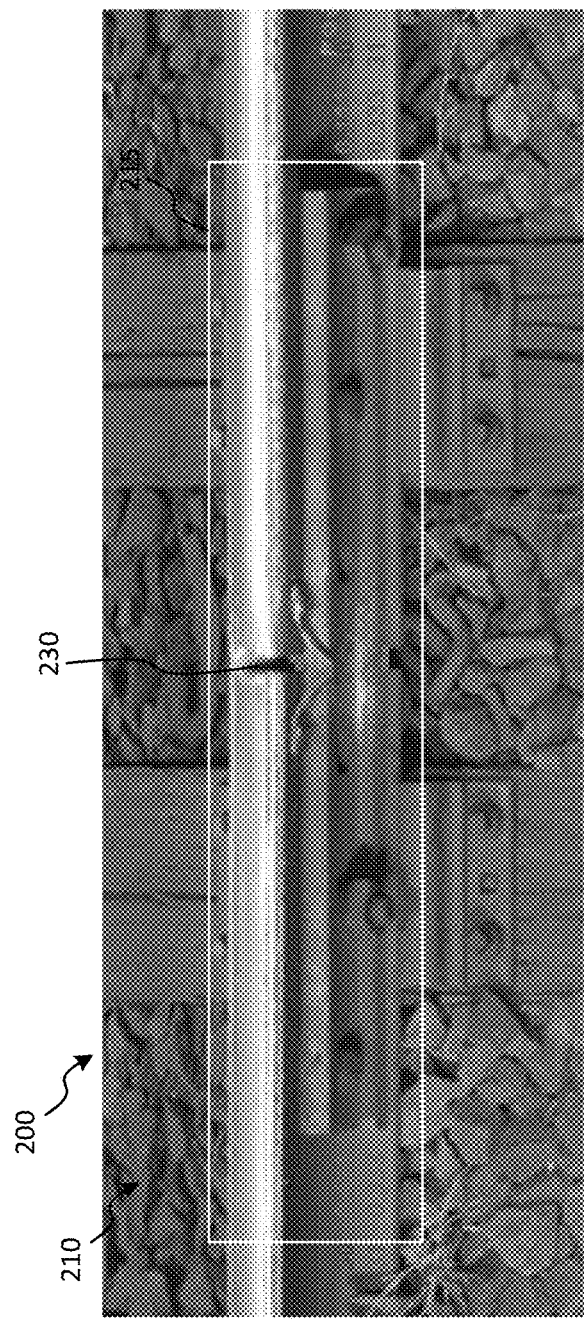
FIG. 2B shows an example of image data captured from a different angle in accordance with embodiments of the present disclosure.

In embodiments, the image data obtained by image collector 130 may include images of a same portion of a railroad track captured from different angles. FIG. 2B shows an example of image data captured from a different angle in accordance with embodiments of the present disclosure. For example, FIG. 2B shows image data 200, which may include image data for railroad track portion 210 including rail joint section 215 and rail gap 230, captured from a different angle from the angle illustrated in FIG. 2A. In particular, FIG. 2B illustrates image data 200 captured from a field side of rail track portion 210, whereas FIG. 2A illustrates image data 200 captured from a gauge side of rail track portion 210. In embodiments, due to the different angles at which image data 200 may be captured, the discontinuity between rail section 220 and rail section 222, which may represent rail gap 230, may present different characteristics. Indeed, the inventors have found that, in some cases, the discontinuity between rail section 220 and rail section 222, which may represent rail gap 230, may present as a different size. Embodiments of the present disclosure provide mechanisms to adapt to the different characteristics presented in different angled image data for a rail gap and may leverage the different angled views of the rail gap by providing a mechanism to measure the size of the rail gap using the different angle views, and to combine (e.g., by averaging, selecting a maximum value, etc.) the various results into a single rail gap measurement, as will be described in more detail below.

With reference back to FIG. 1, server 110, user interface 140, and image collector 130 may be communicatively coupled via network 145. Network 145 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc. In some embodiments, image collector 130 and server 110 may be communicatively coupled directly, without routing through network 145, such as via a direct connection between sensor 130 and server 110. In some embodiments, image collector 130 may be integrated into server 110, such that image collector 130 may be part of the functionality of server 110, even though image collector 130 is illustrated separately from server 110 in FIG. 1.

Server 110 may be configured to facilitate operations for detecting at least one object associated with a condition of a railroad track in the image data associated with a portion of the railroad track provided by image collector 130, detecting at least two points on the at least one object, determining a physical distance-based measurement of the condition of the railroad track, and generating an alert in response to a determination that the physical distance-based measurement of the condition of the railroad track exceeds a predetermined threshold in accordance with embodiments of the present disclosure. The functionality of server 110 may be provided by the cooperative operation of the various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of server 110 as single and separate blocks, each of the various components of server 110 may be a single component (e.g., a single application, server module, etc.), may be functional components of a same component, or the functionality may be distributed over multiple devices/components. In such embodiments, the functionality of each respective component may be aggregated from the functionality of multiple modules residing in a single, or in multiple devices. In addition, particular functionality described for a particular component of server 110 may actually be part of a different component of server 110, and as such, the description of the particular functionality described for the particular component of server 110 is for illustrative purposes and not limiting in any way.

It is noted that, in embodiments, a physical distance-based measurement of a condition of a railroad track may include a size, a length, a width, an area, a volume, and/or any other dimensional measurement of a physical condition of a railroad track. For example, a physical distance-based measurement of a condition of a railroad track may include a width or length of a rail gap of a rail joint of a railroad track. In another example, a physical distance-based measurement of a condition of a railroad track may include a size of a rail surface condition (e.g., a size of a crack, a size of a metal fatigue region, and/or a size of other defects in the surface of a rail), a length of a spacing or distance between cross ties in a railroad track, a length of a separation between a tie anchor and a cross tie, etc. It will be appreciated that these examples are provided for illustrative purposes and not by way of limitation.

As shown in FIG. 1, server 110 includes processor 111, memory 112, database 126, object detector 120, points detector 121, distance-based measurement logic 123, and alert generator 124. Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some embodiments, implementations of processor 111 may comprise code segments (e.g., software, firmware, and/or hardware logic) executable in hardware, such as a processor, to perform the tasks and functions described herein. In yet other embodiments, processor 111 may be implemented as a combination of hardware and software. Processor 111 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Memory 112 may also be configured to facilitate storage operations. For example, memory 112 may comprise database 126 for storing various information related to operations of system 100. In some embodiments, database 126 may store configuration parameters related to operations of system 100, such as user information, predetermined thresholds, etc. In some embodiments, database 126 may store machine learning models, mathematical models, rules models, algorithms, and/or other models that may be used by components of server 110 to analyze and process the image data associated with a condition of the railroad track to determine a distance-based measurement associated with the condition of the railroad track. For example, in some embodiments, database 126 may store a conversion model that may be used to obtain a physical distance-based measurement associated with the condition of the railroad track based on pixel distance measurements, as will be described in more detail below. In some embodiments, the conversion model may be trained to map a pixel distance-based measurement to a physical distance-based measurement. In embodiments, database 126 may also store thresholds that may be compared against physical distance-based measurements to determine whether an alert may be generated. Database 126 is illustrated as integrated into memory 112, but in some embodiments, database 126 may be provided as a separate storage module or may be provided as a cloud-based storage module. Additionally, or alternatively, database 126 may be a single database, or may be a distributed database implemented over a plurality of database modules.

Object detector 120 may be configured to detect at least one object in the image data provided by image collector 130. As noted above, the image data provided by image collector 130 may include image data associated with at least a portion of railroad track 150, such as at least one image of a railroad track section. In embodiments, the at least one image of the railroad track section may include at least one object, and the at least one object may be associated with a condition of railroad track 150.

For example, with reference to FIG. 2A, image data 200 may include an image of railroad track portion 210, which may include rail joint section 215 at which rail section 220 and rail section 222 are joined together, rail section end 223 to rail section end 221. As seen in FIG. 2A, image data 200 includes at least one object (e.g., rail gap 230) associated with a condition of railroad track 150 (e.g., a width of rail gap 230). As noted above, the width of rail gap 230 may be indicative of a serious problem with railroad track 150 or may itself be a serious problem. In this example, object detector 120 may be configured to detect rail gap 230.

In some embodiments, detecting rail gap 230 may include detecting a discontinuity in the rail formed by rail section 220 and rail section 222 in rail joint section 215. The discontinuity in the rail formed by rail section 220 and rail section 222 may be detected by applying a classification model trained to identify and/or label objects within image data. In this case, the classification model may be applied to image data 200 to detect the discontinuity in the rail formed by rail section 220 and rail section 222. The discontinuity in the rail formed by rail section 220 and rail section 222 in rail joint section 215 may be determined to be the rail gap between rail section 220 and rail section 222 in rail joint section 215. In some embodiments, detecting the discontinuity in the rail formed by rail section 220 and rail section 222 in rail joint section 215 may include applying a classification model trained to detect rail section 220 and rail section 222. In this case, a rail gap may be determined as the spacing or gap between rail section 220 and rail section 222.

In some embodiments, object detector 120 may operate to detect a crack or metal fatigue indicator (e.g., the at least one object) on the surface of a rail section (e.g., rail section 220 and/or rail section 222) or any other component of railroad track 150, having a physical size (e.g., a condition) associated with railroad track 150. The physical size of the crack or metal fatigue indicator on the surface of railroad track component may be indicative of a serious problem with railroad track 150 or may itself be a serious problem. In some embodiments, object detector 120 may operate to detect at least two cross ties (e.g., the at least one object) separated by a distance (e.g., a condition associated with the railroad track). The distance of the separation between the at least two cross ties may be indicative of a serious problem with the railroad track or may itself be a serious problem. In some embodiments, object detector 120 may operate to detect at least a tie anchor and a cross tie (e.g., the at least one object) separated by a distance (e.g., a condition associated with the railroad track). The distance of the separation between the tie anchor and the cross tie may be indicative of a serious problem with the railroad track or may itself be a serious problem. It is again noted that these examples are provided for illustrative purposes and not by way of limitation.

In embodiments, the functionality of object detector 120 to detect at least one object in the image data provided by image collector 130 may be integrated into server 110. For example, as illustrated in the example shown in FIG. 1, object detector 120 may be part of server 110 and may be perform operations to detect at least one object in the image data provided by image collector 130.

In alternative or additional embodiments, object detector 120 may be configured receive object detection data associated with the image data from an external system. For example, in some embodiments, the image data associated with the at least one portion of railroad track 150 may be processed by an external system to detect objects present in the image data. The objects detected in the image data may be labeled by the external system and the labels may be provided to object detector 120. In these embodiments, object detector 120 may pass on the labeled image data to points detector 121 for further processing. In some embodiments, object detector 120 may further process the labeled data to extract target sections from the labeled image data. For example, in some cases, the labeled image data may include image data with labels for various detected objects within the image data. In this case, object detector 120 may extract, such as by cropping, a target section of the image data. For example, object detector 120 may extract a target section of the image data including a detected discontinuity, a target section including a detected crack or metal fatigue indicator, a target section including detected cross ties, a target section including an anchor and a cross tie, etc. In these cases, object detector 120 may provide the extracted, or cropped, image data section to points detector 121 for further processing.

Points detector 121 may be configured to detect or identify at least two points on the at least one object detected by object detector 120. In embodiments, points detector 121 may be configured to detect the at least two points detected on the at least one object in a configuration to facilitate a distance-based measurement being performed. For example, in some embodiments, points detector 121 may detect at least two points on edges of the at least object. By detecting points at the edges of the at least one object, points detector 121 may facilitate performing a distance-based measurement of the at least one object. For example, the at least one object may include a discontinuity representing a rail gap. In this example, points detector 121 may be configured to detect at least two points on the discontinuity, where the at least two points are disposes on edges of the discontinuity. In some embodiments, a first point of the at least two points may be disposed on a first edge of the discontinuity and a second point of the at least two points may be disposed on a second edge of the discontinuity different from the first edge. In this manner, a two-dimensional measurement (e.g., length or width) associated with the discontinuity may be obtained based on the two points.

In some embodiments, the number of points in the at least two points may depend on the type of measurement targeted. For example, two points may be sufficient to measure a length or width. However, at least three points, or in some cases even more points, may be required to measure area or volume. In some embodiments, the number of points identified on the at least one object may be based on the type of the at least one object. For example, the at least one object may include a discontinuity representing a rail gap. In this example, as the at least one object is a rail gap discontinuity, the at least two points may include two points, one at each of opposite edges of the rail gap discontinuity (e.g., the rail gap discontinuity edges proximate to the ends of the rail sections forming the rail gap) in order to facilitate a determination of the physical width of the rail gap. In another example, the at least one object may include a metal fatigue indicator on a rail surface. In this example, as the at least one object is a metal fatigue indicator, the at least two points may include at least two points, one at each of opposite ends of the metal fatigue indicator, to facilitate a determination of the physical length of the metal fatigue indicator, or may include at least three points to facilitate a determination of a physical area of the metal fatigue indicator on the rail surface.

In embodiments, detecting the edges of the at least one object may include applying an edge detection model to the image data associated with the at least one object. In embodiments, points detector 121 may include edge detector 122. Edge detector 122 may be configured to detect at least one edge of the at least one object detected by object detector 120. In embodiments, edge detector 122 may be configured to apply an edge detection model to image data including an object detection to detect at least one edge of the detected object. In embodiments, edge detector 122 may be configured to analyze the grayscale values between various pixels of the image data in order to detect the at least one edge of the detected object. An example of edge detection is illustrated in FIG. 3.

Figure 3:
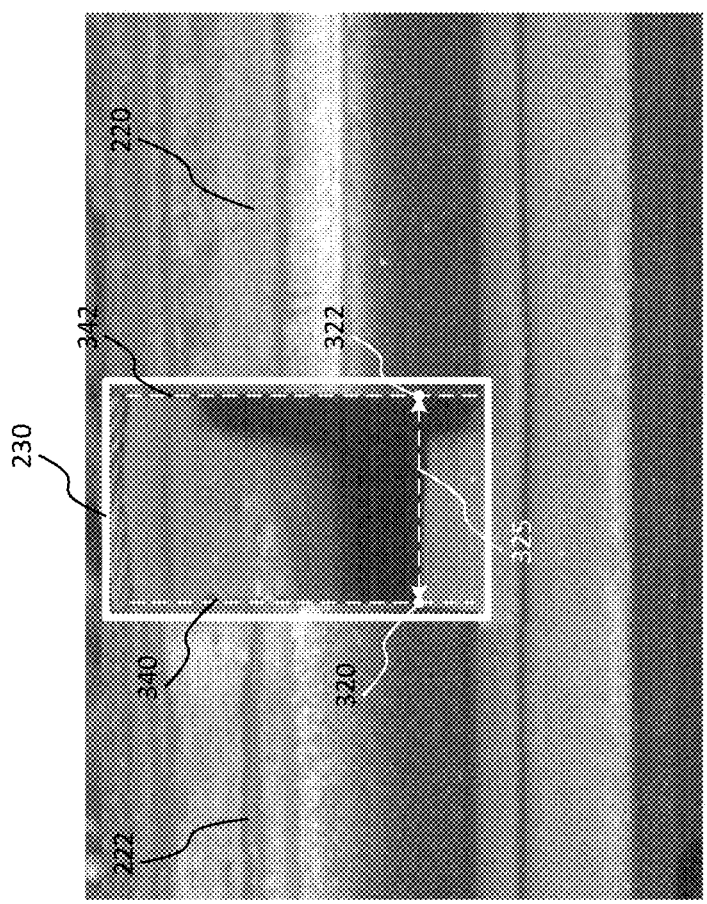
FIG. 3 shows an example of edge detection and distance-based measurement of a rail gap in accordance with embodiments of the present disclosure.

FIG. 3 shows an example of edge detection and distance-based measurement of a rail gap in accordance with embodiments of the present disclosure. As shown in FIG. 3, rail gap 230 may be detected as a discontinuity in a rail joint section including a rail joint between rail section 220 and rail section 222. In this example, edge detector 122 may apply an edge detection model to the image detection (e.g., rail gap 230) and may detect at least edge 340 and edge 342 of rail gap 230. In embodiments, the edge detection model applied by edge detector 122 to identify the edges of rail gap 230 may include identifying the inside surface of the ends of rail section 220 and rail section 222 and determining the edge to be the plane along which the inside surfaces lie. In this case, the edge detection model applied by edge detector 122 may analyze the differences between the pixels in the detected discontinuity to identify the edges of the discontinuity.

In embodiments, having identified the edges of the discontinuity associated with rail gap 230, points detector 121 may detect at least two points on the identified edges of the discontinuity associated with rail gap 230. For example, in embodiments, points detector 121 may apply a point identification model to generate point data associated with the at least one object (e.g., the discontinuity associated with rail gap 230). In this example, points detector 121 may identify point 320 on edge 340 of the discontinuity associated with rail gap 230 and may identify point 322 on edge 342 of the discontinuity associated with rail gap 230. In embodiments, the point identification model may be trained to identify a point on the edge of the at least one object based on an expected contrast in the image data at a particular location within the at least one object. For example, the location of point 320 is expected to include a region of high contrast, as the location of point 320 within rail gap 230 is one that is distinguished by the intersection of the top inside flange of the joint bar connecting rail section 220 and rail section 222 together and the discontinuity at the point where a shadow may be cast by rail section 220 and/or rail section 222 onto rail gap 230. The contrast between the shaded portion of the discontinuity and the non-shaded portion of the discontinuity along the edge (e.g., edge 340) provides a mechanism for the point identification model to consistently identify the at least two points on the edges of the discontinuity associated with rail gap 230.

In some embodiments, points detector 121 may provide the identification of the at least two points to distance-based measurement logic 123 for further processing. In embodiments, the identification of the at least two points may be provided by points detector 121 as a data structure. The data structure may identify each point as a coordinate within the image data. For example, rail gap 230 may be identified as a focus box of a given size and defined by x and y coordinates. In embodiments, point 320 and point 322 may be identified by points detector 121 by x and y coordinates within the image data in which rail gap 230 is detected. In some embodiments, the x and y coordinates may refer to pixel location, where the x coordinate provides the x location in pixels and the y coordinate provides the y location in pixels.

With reference back to FIG. 1, distance-based measurement logic 123 may be configured to determine a physical distance-based measurement of the condition of the railroad track associated with the at least one object based on the at least two points on the at least one object identified by points detector 121. In embodiments, determining the physical distance-based measurement of the condition of the railroad track associated with the at least one object may include measuring a pixel distance between the at least two points on the at least one object identified by points detector 121, and determining, using a conversion model, the physical distance-based measurement of the condition of the railroad track associated with the at least one object based on the pixel distance between the at least two points on the at least one object.

In embodiments, measuring a pixel distance between the at least two points on the at least one object may include determining the number of pixels in a line between the at least two points. For example, with reference to FIG. 3, pixel distance 325 between point 320 and point 322 may include a number of pixels. In embodiments, pixel distance 325 may be measured by counting the pixels between point 320 and point 322 along pixel distance 325. In some embodiments, pixel distance 325 may be measured by determining the difference between the locations of point 320 and point 322. For example, the locations of each point 320 and point 322 may be identified by x and y coordinates within the image data in which rail gap 230 is detected. In this case, the absolute difference between the y coordinate of point 320 and the y coordinate of point 322 may be obtained, which may yield a number of pixels between point 320 and point 322 along a straight line (e.g., pixel distance 325).

It is noted that the pixel distance between two points on the edges of an object detected in the image data may be precisely that, the distance between the two points in the image data in terms of pixels. However, the distance between the two points on the edges of an object detected in the image data may also correlate to a physical distance between the real-world points represented in the image data and corresponding the two points. For example, points 320 and 322 on the edges of the discontinuity associated with rail gap 230 may correspond to real-world points on the edges of the physical rail gap represented by rail gap 230. In embodiments, distance-based measurement logic 123 may provide functionality to map a pixel distance to a physical distance-based measurement.

For example, distance-based measurement logic 123 may determine a physical width of the physical rail gap represented by rail gap 230 based on the pixel distance between point 320 and point 322. For example, pixel distance 325 may be mapped to a physical distance-based measurement, which in this example may be a physical width of the physical rail gap represented by rail gap 230. In embodiments, the physical width of the physical rail gap represented by rail gap 230 may be expressed in inches.

In embodiments, distance-based measurement logic 123 may include a conversion model that may be configured to map a pixel distance to a physical distance-based measurement. In embodiments, the conversion model may operate to receive as an input a pixel distance between at least two points on edges of at least one object detected in image data and to output a physical distance-based measurement corresponding to a physical measurement between real-world points corresponding to the at least two points in the image data. In this manner, the conversion model of distance-based measurement logic 123 may operate to provide a physical distance-based measurement of a condition of a railroad track associated with at least one object detected in image data associated with at least a portion of the railroad track.

In some embodiments, the conversion model of distance-based measurement logic 123 may include a conversion formula that converts a number of pixels (e.g., a pixel distance) into a physical distance (e.g., a distance measurement in inches, millimeters, centimeters, feet, etc.). For example, a pixel distance may be divided or multiplied by a conversion factor to generate the physical distance. In some embodiments, the conversion factor may define a pixels-per-inch value that may be used to convert the pixel distance (e.g., a number of pixels between two points) to a physical distance value (e.g., a distance in inches). In some embodiments, the pixels-per-inch value may be a value between 30 and 60 pixels per inch. In embodiments, the conversion factor may vary depending on the resolution of the image data obtained by image collector 130. In some embodiments, as the resolution of the image data increases, the pixels-per-inch value may also increase, and as the resolution of the image data decreases, the pixels-per-inch value may also decrease. In some embodiments, the conversion factor may be based, at least in part, on a distance from a camera capturing the image data to the at least one object, an angle of the camera capturing the image data with respect to the at least one object, a type of the camera, etc.

In embodiments, the conversion factor may be based on a calibration process that may be used to train the conversion model of distance-based measurement logic 123. In embodiments, the calibration process that may be used to train the conversion model of distance-based measurement logic 123 may include using training images of known physical distances between two points obtained using a configuration that is substantially equivalent to the configuration of system 100 and measuring the pixel distance between the two points in the training images. For example, an image including two points whose physical distance in the real-world is known may be processed and a pixel distance between the two points may be measured. In this example, the conversion model of distance-based measurement logic 123 may learn to map the measured pixel distance to the known physical distance between the two points. In embodiments, a configuration that is substantially equivalent to the configuration of system 100 may include a configuration in which an image detector used to capture the training images may be mounted onto a train car in a similar orientation as image detector 130 may be mounted during operation of system 100.

In embodiments, distance-based measurement logic 123 may be configured to operate as an integration application that may be executed by another module, such as points detector 121 or edge detector 122. In these embodiments, distance-based measurement logic 123 may be executed to determine a physical distance-based measurement of the condition of the railroad track associated with the at least one object based on the at least two points on the at least one object identified by points detector 121 and may operate to return the results (e.g., the physical distance-based measurement) in a specific data structure that may be fed into external systems, sin some embodiments.

In some embodiments, as noted above, the image data associated with the at least a portion of the railroad track in which the at least one object associated with the condition of the track is detected may include more than one image of the at least a portion of the railroad track captured from different perspectives or angles. For example, as noted above, in some embodiments, the image data may include more than one image of the same portion of the railroad track, but captured from different angles. In some embodiments, more than one camera may be used to capture the image data, such as a plurality of cameras mounted at different angles on a train car upon which the plurality of cameras may be mounted. In some embodiments, at least one camera may be mounted to capture the at least a portion of the railroad track from the gauge side of the railroad track and at least one camera may be mounted to capture the at least a portion of the railroad track from the field side of the railroad track. In embodiments, the image data including the images of the at least a portion of the railroad track captured from different angles may be processed through object detector 120, points detector 121, and distance-based measurement logic 123 such that, for each image of the at least a portion of the railroad track, the at least one object associated with the condition of the railroad track may be detected, at least two points on the at least one object may be identified, and a physical distance-based measurement of the condition of the railroad track associated with the at least one object may be determined based on the at least two points on the at least one object.

In embodiments, distance-based measurement logic 123 may be configured to combine the results (e.g., the physical distance-based measurement of the condition of the railroad track associated with the at least one object) obtained for each of the images of the at least a portion of the railroad track captured from different angles to generate an overall physical distance-based measurement of the condition of the railroad track associated with the at least one object. For example, physical distance-based measurement of the condition of the railroad track associated with the at least one object detected in a first image captured from a first angle (e.g., a gauge side angle) may be combined with physical distance-based measurement of the condition of the railroad track associated with the at least one object detected in a second image captured from a second angle (e.g., a field side angle) to obtain an overall physical distance-based measurement of the condition of the railroad track associated with the at least one object. In some embodiments, more than two images may be used in the determination of the overall physical distance-based measurement of the condition of the railroad track associated with the at least one object.

In embodiments, combining the results obtained for each of the images of the at least a portion of the railroad track captured from different angles may include averaging the physical distance-based measurements of the condition of the railroad track associated with the at least one object detected in all the images. In embodiments, combining the results obtained for each of the images of the at least a portion of the railroad track captured from different angles may include selecting the maximum physical distance-based measurement of the condition of the railroad track associated with the at least one object from among the physical distance-based measurements of the condition of the railroad track associated with the at least one object for all the images.

With reference back to FIG. 1, alert generator 124 may be configured to generate an alert in response to a determination that the physical distance-based measurement of the condition of the railroad track associated with the at least one object exceeds a predetermined threshold. In embodiments, the alert may be transmitted to an operator, e.g., via user interface 140. In embodiments, the alerts generated by alert generator 124 may include alerts of different severity levels. For example, an alert of a first severity level may indicate to the operator that the condition of the railroad track associated with the at least one object is severe and immediate action must be taken to avoid a potentially catastrophic failure. For example, with reference to FIG. 3, distance-based measurement logic 123 may determine that the physical width of rail gap 230 may be greater than 2 inches. In this case, an alert may be generated by alert generator 124 indicating that immediate action must be taken to reduce the physical width of rail gap 230 in order to avoid a catastrophic failure. An alert of a second severity level may indicate to the operator that the condition of the railroad track associated with the at least one object is moderate and an action to address the condition of the railroad track may be taken at a later time. For example, distance-based measurement logic 123 may determine that the physical width of rail gap 230 may be greater than 1.5 and less than 2 inches. In this case, a moderate alert may be generated by alert generator 124 indicating that action to reduce the physical width of rail gap 230 may be taken at a later time and that catastrophic failure is not necessarily imminent.

An alert of a third severity level may indicate to the operator that the condition of the railroad track associated with the at least one object is satisfactory, and no action needs to be taken at this time. For example, distance-based measurement logic 123 may determine that the physical width of rail gap 230 may be less than 1.5 inches. In this case, a low alert may be generated by alert generator 124 indicating that not action is necessary at this time with respect to rail gap 230. In some embodiments, an alert of a third severity level may not be generated when the condition of the railroad track associated with the at least one object is satisfactory and instead, no alert is generated.

It is noted that the discussion above with respect to three severity levels is for illustrative purposes and should not be construed as limiting in any way. Indeed, in embodiments, more or less than three severity levels may be used for categorizing alerts and in these cases, the severity of the alerts may correspond to the physical size of the condition of the railroad track associated with the at least one object.

Figure 4:
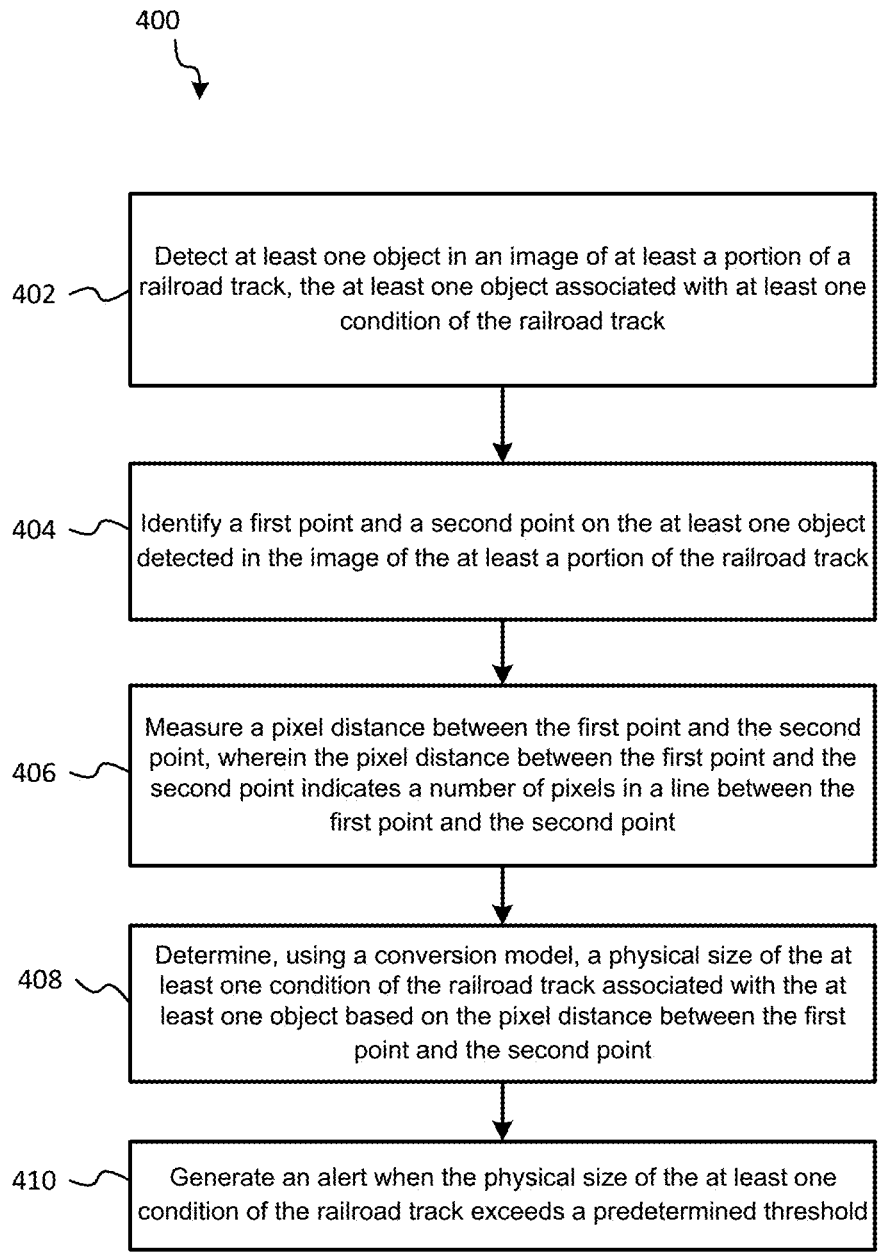
FIG. 4 shows a high-level flow diagram of operation of a system configured in accordance with embodiments of the present disclosure for providing functionality to detect and measure conditions of a railroad track and/or railroad track components based on image-based distance measurements.

FIG. 4 shows a high-level flow diagram 400 of operation of a system configured in accordance with embodiments of the present disclosure for providing functionality to detect and measure conditions of a railroad track and/or railroad track components based on image-based distance measurements. For example, the functions illustrated in the example blocks shown in FIG. 4 may be performed by system 100 of FIG. 1 according to embodiments herein. In embodiments, the operations of the method 400 may be stored as instructions that, when executed by one or more processors, cause the one or more processors to perform the operations of the method 400.

At block 402, at least one object may be detected in an image of at least a portion of a railroad track. In embodiments, the at least one object may be associated with at least one condition of the railroad track. In embodiments, functionality of an object detector (e.g., object detector 120 in FIG. 1) may be used to detect the at least one object in the image of the at least a portion of the railroad track. In embodiments, the object detector may perform operations to detect the at least one object in the image of the at least a portion of the railroad track according to operations and functionality as described above with reference to object detector 120 and as illustrated in FIGS. 1-3.

At block 404, a first point and a second point on the at least one object detected in the image of the at least a portion of the railroad track may be identified. In embodiments, functionality of a points detector (e.g., points detector 121 in FIG. 1) may be used to identify the first point and the second point on the at least one object detected in the image of the at least a portion of the railroad track. In embodiments, the points detector may perform operations to identify the first point and the second point on the at least one object detected in the image of the at least a portion of the railroad track according to operations and functionality as described above with reference to points detector 121 and as illustrated in FIGS. 1-3.

At block 406, a pixel distance between the first point and the second point may be measured. In embodiments, the pixel distance between the first point and the second point may indicate a number of pixels in a line between the first point and the second point. In embodiments, functionality of a distance-based measurement logic (e.g., distance-based measurement logic 123 in FIG. 1) may be used to measure the pixel distance between the first point and the second point. In embodiments, the distance-based measurement logic may perform operations to measure the pixel distance between the first point and the second point according to operations and functionality as described above with reference to distance-based measurement logic 123 and as illustrated in FIGS. 1-3.

At block 408, a physical size of the at least one condition of the railroad track associated with the at least one object may be determined, using a conversion model, based on the pixel distance between the first point and the second point. In embodiments, functionality of a distance-based measurement logic (e.g., distance-based measurement logic 123 in FIG. 1) may be used to determine, using the conversion model, the physical size of the at least one condition of the railroad track associated with the at least one object based on the pixel distance between the first point and the second point. In embodiments, the distance-based measurement logic may perform operations to determine, using the conversion model, the physical size of the at least one condition of the railroad track associated with the at least one object based on the pixel distance between the first point and the second point according to operations and functionality as described above with reference to distance-based measurement logic 123 and as illustrated in FIGS. 1-3.

At block 410, an alert may be generated when the physical size of the at least one condition of the railroad track exceeds a predetermined threshold. In embodiments, functionality of an alert generator (e.g., alert generator 124 in FIG. 1) may be used to generate the alert when the physical size of the at least one condition of the railroad track exceeds the predetermined threshold. In embodiments, the alert generator may perform operations to generate the alert when the physical size of the at least one condition of the railroad track exceeds the predetermined threshold according to operations and functionality as described above with reference to alert generator 124 and as illustrated in FIGS. 1-3.

Figure 5:
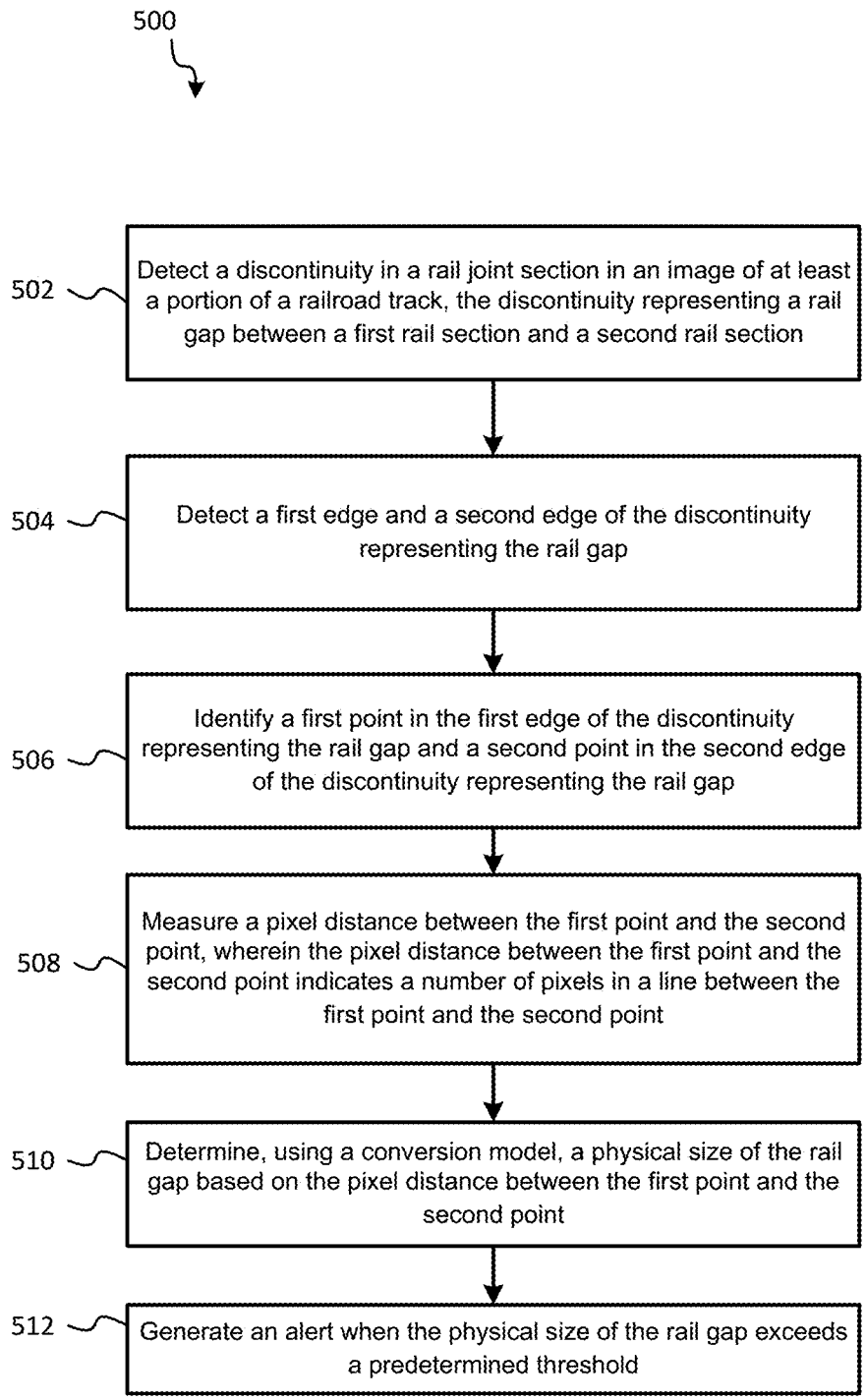
FIG. 5 shows a high-level flow diagram of operation of a system configured in accordance with embodiments of the present disclosure for providing functionality to detect and measure conditions of a railroad track and/or railroad track components based on image-based distance measurements.

FIG. 5 shows a high-level flow diagram 500 of operation of a system configured in accordance with embodiments of the present disclosure for providing functionality to detect and measure conditions of a railroad track and/or railroad track components based on image-based distance measurements. For example, the functions illustrated in the example blocks shown in FIG. 5 may be performed by system 100 of FIG. 1 according to embodiments herein. In embodiments, the operations of the method 500 may be stored as instructions that, when executed by one or more processors, cause the one or more processors to perform the operations of the method 500.

At block 502, a discontinuity in a rail joint section may be detected in an image of at least a portion of a railroad track. In embodiments, the discontinuity may represent a rail gap between a first rail section and a second rail section. In embodiments, functionality of an object detector (e.g., object detector 120 in FIG. 1) may be used to detect the discontinuity in the rail joint section in the image of the at least a portion of a railroad track. In embodiments, the object detector may perform operations to detect the discontinuity in the rail joint section in the image of the at least a portion of a railroad track according to operations and functionality as described above with reference to object detector 120 and as illustrated in FIGS. 1-3.

At block 504, a first edge and a second edge of the discontinuity representing the rail gap may be detected. In embodiments, functionality of an edge detector (e.g., edge detector 122 in FIG. 1) may be used to detect the first edge and the second edge of the discontinuity representing the rail gap. In embodiments, the edge detector may perform operations to detect the first edge and the second edge of the discontinuity representing the rail gap according to operations and functionality as described above with reference to edge detector 122 and as illustrated in FIGS. 1-3.

At block 506, a first point in the first edge of the discontinuity representing the rail gap and a second point in the second edge of the discontinuity representing the rail gap may be identified. In embodiments, functionality of a points detector (e.g., points detector 121 in FIG. 1) may be used to identify the first point in the first edge of the discontinuity representing the rail gap and the second point in the second edge of the discontinuity representing the rail gap. In embodiments, the points detector may perform operations to identify the first point in the first edge of the discontinuity representing the rail gap and the second point in the second edge of the discontinuity representing the rail gap according to operations and functionality as described above with reference to points detector 121 and as illustrated in FIGS. 1-3.

At block 508, a pixel distance between the first point and the second point may be measured. In embodiments, the pixel distance between the first point and the second point may indicate a number of pixels in a line between the first point and the second point. In embodiments, functionality of a distance-based measurement logic (e.g., distance-based measurement logic 123 in FIG. 1) may be used to measure the pixel distance between the first point and the second point. In embodiments, the distance-based measurement logic may perform operations to measure the pixel distance between the first point and the second point according to operations and functionality as described above with reference to distance-based measurement logic 123 and as illustrated in FIGS. 1-3.

At block 510, a physical size of the rail gap may be determined, using a conversion model, based on the pixel distance between the first point and the second point. In embodiments, functionality of a distance-based measurement logic (e.g., distance-based measurement logic 123 in FIG. 1) may be used to determine, using the conversion model, the physical size of the rail gap based on the pixel distance between the first point and the second point. In embodiments, the distance-based measurement logic may perform operations to determine, using the conversion model, the physical size of the rail gap based on the pixel distance between the first point and the second point according to operations and functionality as described above with reference to distance-based measurement logic 123 and as illustrated in FIGS. 1-3.

At block 512, an alert may be generated when the physical size of the rail gap exceeds a predetermined threshold. In embodiments, functionality of an alert generator (e.g., alert generator 124 in FIG. 1) may be used to generate the alert when the physical size of the rail gap exceeds the predetermined threshold. In embodiments, the alert generator may perform operations to generate the alert when the physical size of the rail gap exceeds the predetermined threshold according to operations and functionality as described above with reference to alert generator 124 and as illustrated in FIGS. 1-3.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). For example, the terms "processor" and "controller" can be a class of structures, rather than one specific structure, and may be defined with functional terms, but that does not make it means-plus-function. Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules in FIGS. 1-5 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. The terms Disk and disc can include compact disc (CD), laser disc, optical disc, digital versatile disc (DVD), floppy disk, and Blu-ray disc where disks usually reproduce data magnetically, while discs usually reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function, in substantially the same way, or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of determining a condition of a railroad track, comprising:
   collecting image data related to at least a portion of a railroad track via one or more sensors disposed on a vehicle traveling along the railroad track;
   detecting at least one object in at least one image of at least a portion of the railroad track in the image data, the at least one object associated with at least one condition of the railroad track, wherein the at least one image includes a plurality of images each captured from a different angle;
   identifying a first point and a second point on the at least one object detected in each image of the plurality of images captured from a different angle;
   measuring a pixel distance between the first point and the second point in each image of the plurality of images captured from a different angle, wherein the pixel distance between the first point and the second point indicates a number of pixels in a line between the first point and the second point;
   determining, using a conversion model, a physical size of the at least one condition of the railroad track associated with the at least one object based on the pixel distance between the first point and the second point measured in each image of the plurality of images captured from a different angle, wherein determining the physical size of the at least one condition of the railroad track associated with the at least one object based on the pixel distance between the first point and the second point measured in each image of the plurality of images captured from a different angle includes one of:
   averaging the physical size of the at least one condition of the railroad track associated with the at least one object based on the pixel distance between the first point and the second point measured in all images of the plurality of images captured from a different angle; and selecting a maximum physical distance-based measurement value from among the physical size of the at least one condition of the railroad track associated with the at least one object based on the pixel distance between the first point and the second point measured for all images of the plurality of images captured from a different angle; and generating an alert when the physical size of the at least one condition of the railroad track exceeds a predetermined threshold.

2. The method of claim 1, wherein identifying the first point and the second point on the at least one object detected in the at least one image of the at least a portion of the railroad track includes:

inputting the at least one object detection into an edge detection model, wherein the edge detection model is configured to detect at least one edge of the at least one object; and identifying the first point on a first edge of the at least one edge of the at least one object and the second point on a second edge of the at least one edge of the at least one object.

3. The method of claim 1, further comprising obtaining the at least one image of the at least a portion of the railroad track while traveling over the railroad track.

4. The method of claim 1, wherein the conversion model defines a conversion formula for converting a number of pixels into a physical distance.

5. The method of claim 4, wherein the conversion formula defines a pixels-per-inch value to convert the pixel distance into the physical distance wherein the pixels-per-inch value is between 30 and 60 pixels per inch.

6. The method of claim 1, wherein the at least one condition of the railroad track associated with the at least one object includes one or more of:

a width of a rail gap between a first rail section and a second rail section within a rail joint section of the railroad track;

a surface condition of a rail section of the railroad track, wherein the surface condition includes one or more of a defect, a crack, and a metal fatigue indicator;

a spacing between two or more cross ties; and a separation between an anchor and a cross tie.

7. The method of claim 1, further comprising obtaining the at least one image of the at least a portion of the railroad track while traveling over the railroad track.

8. The method of claim 1, wherein the conversion model defines a conversion formula for converting a number of pixels into a physical distance.

9. The method of claim 8, wherein the conversion formula defines a pixels-per-inch value to convert the pixel distance into the physical distance wherein the pixels-per-inch value is between 30 and 60 pixels per inch.

10. A method of determining a condition of a railroad track, comprising:

collecting image data related to at least a portion of a railroad track via one or more sensors disposed on a vehicle traveling along the railroad track;

detecting a discontinuity in a rail joint section in at least one image of at least a portion of the railroad track in the image data, the discontinuity representing a rail gap between a first rail section and a second rail section, wherein the at least one image includes a plurality of images each captured from a different angle;

detecting a first edge and a second edge of the discontinuity representing the rail gap;

identifying a first point in the first edge of the discontinuity representing the rail gap and a second point in the second edge of the discontinuity representing the rail gap in each image of the plurality of images captured from a different angle;

measuring a pixel distance between the first point and the second point in each image of the plurality of images captured from a different angle, wherein the pixel distance between the first point and the second point indicates a number of pixels in a line between the first point and the second point;

determining, using a conversion model, a physical size of the rail gap based on the pixel distance between the first point and the second point measured in each image of the plurality of images captured from a different angle, wherein determining the physical size of the rail gap based on the pixel distance between the first point and the second point measured in each image of the plurality of images captured from a different angle includes one of:

averaging the physical size of the rail gap based on the pixel distance between the first point and the second point measured in all images of the plurality of images captured from a different angle; or selecting a maximum physical distance-based measurement value from among the physical size of the rail gap based on the pixel distance between the first point and the second point measured for all images of the plurality of images captured from a different angle; and generating an alert when the physical size of the rail gap exceeds a predetermined threshold.

11. The method of claim 10, wherein detecting the first edge and the second edge of the discontinuity representing the rail gap includes:

inputting the discontinuity detection into an edge detection model, wherein the edge detection model is configured to detect the first edge and the second edge of the discontinuity representing the rail gap.

12. A system for determining a condition of a railroad track, the system comprising:

at least one processor; and a memory operably coupled to the at least one processor and storing processor-readable code that, when executed by the at least one processor, is configured to perform operations including:

one or more sensors disposed on a vehicle traveling along the railroad track configured to collect image data related to at least a portion of a railroad track;

detecting at least one object in at least one image of at least a portion of the railroad track in the image data, the at least one object associated with at least one condition of the railroad track, wherein the at least one image includes a plurality of images each captured from a different angle;

identifying a first point and a second point on the at least one object detected in each image of the plurality of images captured from a different angle;

measuring a pixel distance between the first point and the second point in each image of the plurality of images captured from a different angle, wherein the pixel distance between the first point and the second point indicates a number of pixels in a line between the first point and the second point;

determining, using a conversion model, a physical size of the at least one condition of the railroad track associated with the at least one object based on the pixel distance between the first point and the second point measured in each image of the plurality of images captured from a different angle, wherein determining the physical size of the at least one condition of the railroad track associated with the at least one object based on the pixel distance between the first point and the second point measured in each image of the plurality of images captured from a different angle includes one of:

averaging the physical size of the at least one condition of the railroad track associated with the at least one object based on the pixel distance between the first point and the second point measured in all images of the plurality of images captured from a different angle; and selecting a maximum physical distance-based measurement value from among the physical size of the at least one condition of the railroad track associated with the at least one object based on the pixel distance between the first point and the second point measured for all images of the plurality of images captured from a different angle; and generating an alert when the physical size of the at least one condition of the railroad track exceeds a predetermined threshold.

13. The system of claim 12, wherein identifying the first point and the second point on the at least one object detected in the at least one image of the at least a portion of the railroad track includes:

inputting the at least one object detection into an edge detection model, wherein the edge detection model is configured to detect at least one edge of the at least one object; and identifying the first point on a first edge of the at least one edge of the at least one object and the second point on a second edge of the at least one edge of the at least one object.

14. The system of claim 12, wherein the conversion model defines a conversion formula for converting a number of pixels into a physical distance, and wherein the conversion formula defines a pixels-per-inch value to convert the pixel distance into the physical distance wherein the pixels-per-inch value is between 30 and 60 pixels per inch.

* * * * *